United States Patent [19]

Kuriyama

[11] Patent Number: 5,228,367

[45] Date of Patent: Jul. 20, 1993

[54] CONTROL SYSTEM FOR AUTOMOTIVE ENGINE WITH AUTOMATIC TRANSMISSION

[75] Inventor: Minoru Kuriyama, Higashihiroshima, Japan

[73] Assignee: Mazda Motor Corporation, Hiroshima, Japan

[21] Appl. No.: 796,935

[22] Filed: Nov. 25, 1991

[30] Foreign Application Priority Data

Nov. 24, 1990 [JP] Japan .................. 2-319386

[51] Int. Cl.⁵ .................. B60K 41/08; B60K 41/04; B60K 41/06
[52] U.S. Cl. ......................... 74/858; 74/857; 74/859; 74/860
[58] Field of Search ............. 74/857, 858, 859, 860

[56] References Cited

U.S. PATENT DOCUMENTS

| | | | |
|---|---|---|---|
| 3,792,630 | 2/1974 | Hause | 74/860 |
| 4,226,141 | 10/1980 | Espenschied | 74/858 |
| 4,266,447 | 5/1981 | Heess et al. | 74/866 X |
| 4,355,550 | 10/1982 | Will et al. | 74/858 X |
| 4,370,903 | 2/1983 | Stroh et al. | 74/858 |
| 4,403,527 | 9/1983 | Mohl et al. | 74/858 X |
| 4,770,064 | 9/1988 | Kuerschner | 74/858 |
| 4,933,851 | 6/1990 | Ito et al. | 74/857 X |
| 5,036,728 | 8/1991 | Kawasoe et al. | 74/858 |
| 5,038,287 | 8/1991 | Taniguchi et al. | 74/858 X |
| 5,072,630 | 12/1991 | Kikuchi et al. | 74/858 |
| 5,094,125 | 3/1992 | Bota | 74/859 X |

FOREIGN PATENT DOCUMENTS

| | | |
|---|---|---|
| 55-69738 | 5/1980 | Japan . |
| 1-273736 | 11/1989 | Japan .................. 74/857 |
| 1-273737 | 11/1989 | Japan .................. 74/857 |
| 2-119646 | 5/1990 | Japan .................. 74/858 |

Primary Examiner—Leslie A. Braun
Assistant Examiner—David E. Henn
Attorney, Agent, or Firm—Keck, Mahin & Cate

[57] ABSTRACT

A control system for controlling an engine having an automatic transmission includes an engine torque controller for dropping an engine output torque after a downshift signal is provided and calculating a value representative of an engine output torque. The engine output torque is dropped sooner as the value calculated becomes larger when a downshift signal is provided.

6 Claims, 4 Drawing Sheets

CONTROL SYSTEM FOR AUTOMOTIVE ENGINE WITH AUTOMATIC TRANSMISSION

BACKGROUND OF THE INVENTION

1. Field of the Invention

The present invention relates to a control system for an automobile engine equipped with an automatic transmission and, more particularly, to an automobile engine control system for controlling the beginning and end points of a engine torque dropping control during a downshift of the automatic transmission to reduce shift shocks due to torque changes.

2. Description of Related Art

Typically, an automobile engine equipped with an automotive transmission is controlled so that its output torque drops at a predetermined time, particularly during a downshift of the automatic transmission, so as to avoid shift shocks due to engine output torque changes. In controlling the proper times at which dropping of the engine output torque begins or ends during a downshift of the automatic transmission, it is generally determined that the proper time at which the automatic transmission begins to shift itself down should be based on a change in rotational speed of a turbine of the automatic transmission (which is referred to as turbine speed). The turbine speed at which engine torque dropping control is commenced or finished is obtained from the change in turbine speed multiplied by coefficients which are predetermined according to a particular downshift pattern. Such an engine control system is not known from, for instance, Japanese Unexamined Patent Publication No. 55-69,738.

In a conventional timing control for dropping engine output torque, however, since changes in engine output torque are caused by environmental conditions, such as atmospheric pressure and the temperature of intake air, the time necessary to change the turbine speed and shift the automatic transmission changes. As a result, a calculated turbine speed has an error relative to an actual turbine speed, so that dropping of the engine output torque is executed at a proper time. This results in producing shift shocks in the automatic transmission.

In addition, in the conventional timing control mentioned above, since a shift point is set up according to one of several shift patterns, it is not possible to obtain the proper times at which the engine output torque should begin to drop and finish dropping during a downshift of the automatic transmission.

SUMMARY OF THE INVENTION

It is, accordingly, a primary object of the present invention to provide a control system for controlling an engine equipped with an automatic transmission to set a proper time at which dropping the engine output torque should commence during a downshift of the automatic transmission.

This object of the present invention is accomplished by an engine control system for an automobile engine equipped with an automatic transmission in which the time at which engine output torque drops off is controlled, during a downshift of the automatic transmission, by the use of turbine speed and engine output torque. More specifically, the turbine speed and engine output torque are used at the beginning of the downshift as parameters for setting a proper time at which the dropping of engine output torque should commence. The engine control system includes engine torque control means for dropping an engine output torque at a certain time after a downshift signal is detected and control means for calculating a value representative of an engine output torque and advancing the time so that it becomes shorter as the value representing the engine output torque, detected when a downshift signal is provided, becomes larger.

According to the present invention, the value or parameter representing an engine output torque when a downshift signal is provided is calculated. The time at which the engine output torque drop control begins is changed so that such control starts faster as the parameter becomes larger. In this way, because the engine output torque control time is set by taking into consideration a delay in calculated turbine speed, the control of an engine output torque drop is executed so that the drop occurs at the proper time and independently of environmental conditions and changes in shift points.

BRIEF DESCRIPTION OF THE DRAWINGS

Other features of the present invention will be apparent to those skilled in the art from the following description of a preferred embodiment of the invention when considered in conjunction with the accompanying drawings, in which.

DETAILED DESCRIPTION OF THE PREFERRED EMBODIMENT

Figure 1:
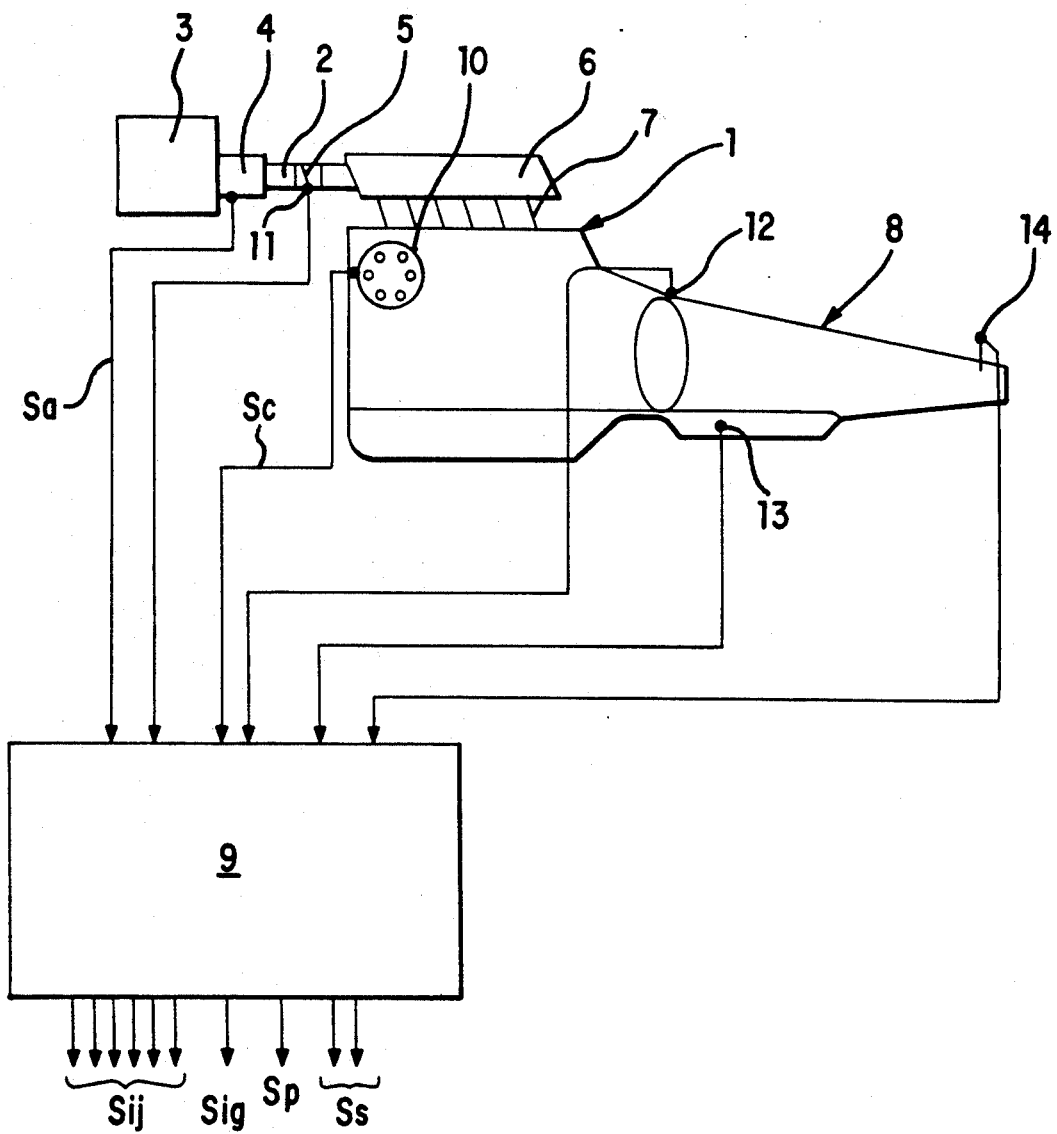
FIG. 1 is a schematic illustration showing an automobile engine equipped with an automatic transmission which is controlled by an engine control system in accordance with a preferred embodiment of the present invention.

Referring to the drawings in detail and, in particular, to FIG. 1, an automotive engine 1, controlled by an engine control system in accordance with a preferred embodiment of the present invention, is shown as including an intake air passage 2 with one end connected to an air cleaner 3. The intake air passage 2 is provided, starting from the air cleaner 3, with an air flow sensor 4 and a throttle valve 5. The degree of opening of the throttle valve 5 is detected by a throttle opening sensor 11. The intake air passage 2 is further provided, downstream of the throttle valve 5, with a surge tank 6, from which a plurality of individual intake air passages 7 branch off. One independent intake air passage is provided for each of the respective cylinders. Each individual intake air passage 7 is provided with a fuel injector (not shown), which may be of any well known type. The engine 1 is equipped with an automatic transmission 8 of the type having a torque converter. The turbine speed of the torque converter is detected by a turbine speed sensor 12. There are provided, in association with the engine 1, various sensors, such as a crank speed sensor 10 for detecting a speed of rotation of the engine crank (not shown) as an engine speed, a temperature sensor 13 for detecting the temperature of oil in the automatic transmission 8 and a vehicle speed sensor 14 for detecting the speed of rotation of an output shaft (not shown) of the automatic transmission 8 as a vehicle speed. All of these sensors, including the air flow sensor 4, the crank speed sensor 10, the throttle opening sensor 11, the turbine speed sensor 12, the temperature sensor 13 and the vehicle speed sensor 14, output respective signals.

Control of the engine 1 and the transmission 8 and, more specifically, of the fuel injectors and igniters of the engine 1 and line pressure control solenoids and shift valves of the transmission 8, is performed by a control unit 9, which mainly comprises a general purpose microcomputer. It should be noted that the structure and operations of the injectors, ignitors, solenoids and shift valves of the engine 1 and transmission 8 are well known in the art. To control the engine 1 and the transmission 8, the control unit 9 provides the fuel injectors, the ignitor, the line pressure control solenoids and the shift valves with control signals Sij, Sig, Sp and Ss, respectively, based on signals from the air flow sensor 4, the crank angle sensor 10, the throttle opening sensor 11, the turbine speed sensor 12, the temperature sensor 13 and the vehicle speed sensor 14.

To control a drop of the engine output torque Et during a downshift of the automatic transmission 8, an increase dTV in turbine speed (which is hereinafter referred to as a turbine speed increase) due to the downshift, namely, the difference of a turbine speed TVe at the end of downshift from a turbine speed TVs at the start of downshift, is obtained from the following formula:

$$dTV = TVe - TVs$$
$$= TVs \times (\text{gear ratio at the end of downshift} - \text{gear ratio at the start of downshift})/\text{gear ratio at the start of downshift}$$

Figure 2A:
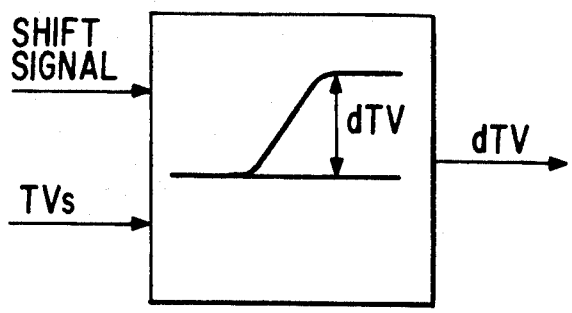
FIGS. 2A to 2E are diagrammatical illustrations for explaining the operation of the engine control system.

To obtain the turbine speed increase dTV from the above formula, the control unit 9 stores, in a memory, a turbine speed increase map for each shift pattern. Such a map is represented in FIG. 2A. The map is determined based on a vehicle speed and a throttle valve opening. Then, as is shown in FIG. 2B, an engine output torque Ets at the start of downshift is calculated, according to a charging efficiency CEs, an ignition timing IGs and an engine speed NEs, all at the start of downshift, from the following equation:

$$Ets = -A \times (IGs - B) + C$$

The charging efficiency CEs is calculated based on the amount of intake air, which is represented by a signal Sa from the air flow sensor 4. The ignition timing IGs and the rotational speed of engine NEs are calculated based on a crank angle, which is represented by a signal Sc from the crank angle sensor 10. The coefficients A, B and C in the above equation are obtained from coefficient maps, such as those which are shown in FIGS. 2C, 2D and 2E, respectively. The maps are set up with respect to charging efficiency CE and the engine speeds NE. The coefficient A, which represents the degree of influence of ignition timing on engine torque, generally becomes larger with an increase in charging efficiency CE, causing an increase in the speed of fuel combustion when the engine speed NE is not changed. The coefficient A also becomes larger as the speed of fuel combustion increases. The coefficient A additionally gets larger as the engine speed NE increases. The coefficient B, which represents an ignition timing IG or crank angle when the engine provides its maximum torque, generally becomes small with an increase in charging efficiency CE while the engine speed NE does not change, since the speed of fuel combustion becomes higher with an increase in charging efficiency. The coefficient B becomes larger as the engine speed NE increases. The coefficient C, which represents the maximum torque of the engine, depends on the characteristics of engine output torque.

Figure 2B:
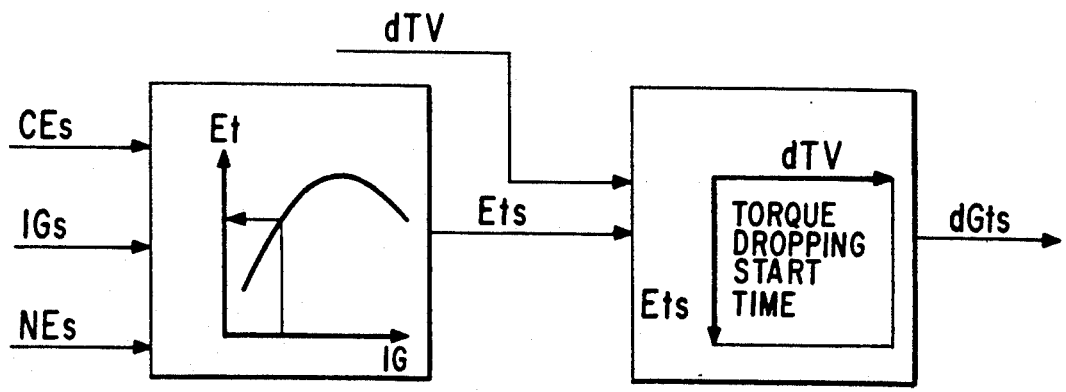
Figures 2C, 2D, 2E:
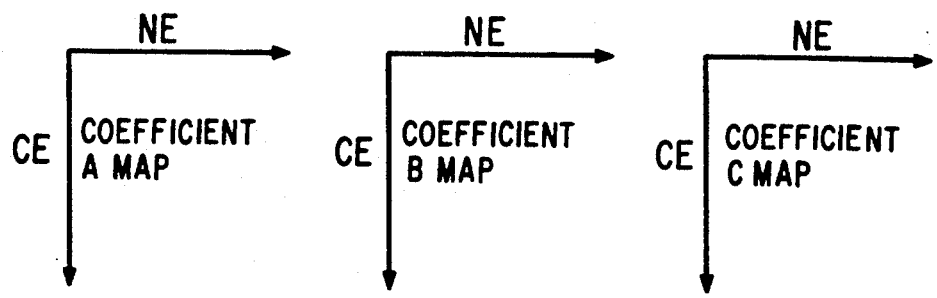

After obtaining the turbine speed increase dTV and the engine output torque Ets at the start of a downshift, the gear ratio difference dGts at the start of a downshift, which is used to determine the time at which an engine torque dropping control starts, is obtained from a gear ratio difference map shown in FIG. 2B. As the torque provided by the engine in the presence of a shift signal gets longer, the inclination or change rate of a gear ratio gets larger. The gear ratio difference dGts, at the start of a downshift, is set up so as to advance the time at which the engine torque dropping control starts when the engine torque is larger.

A gear ratio difference for determining the time for stopping or ending the engine torque stopping control is set up in the same manner as for determining the time for starting the engine torque dropping control.

Figure 3:
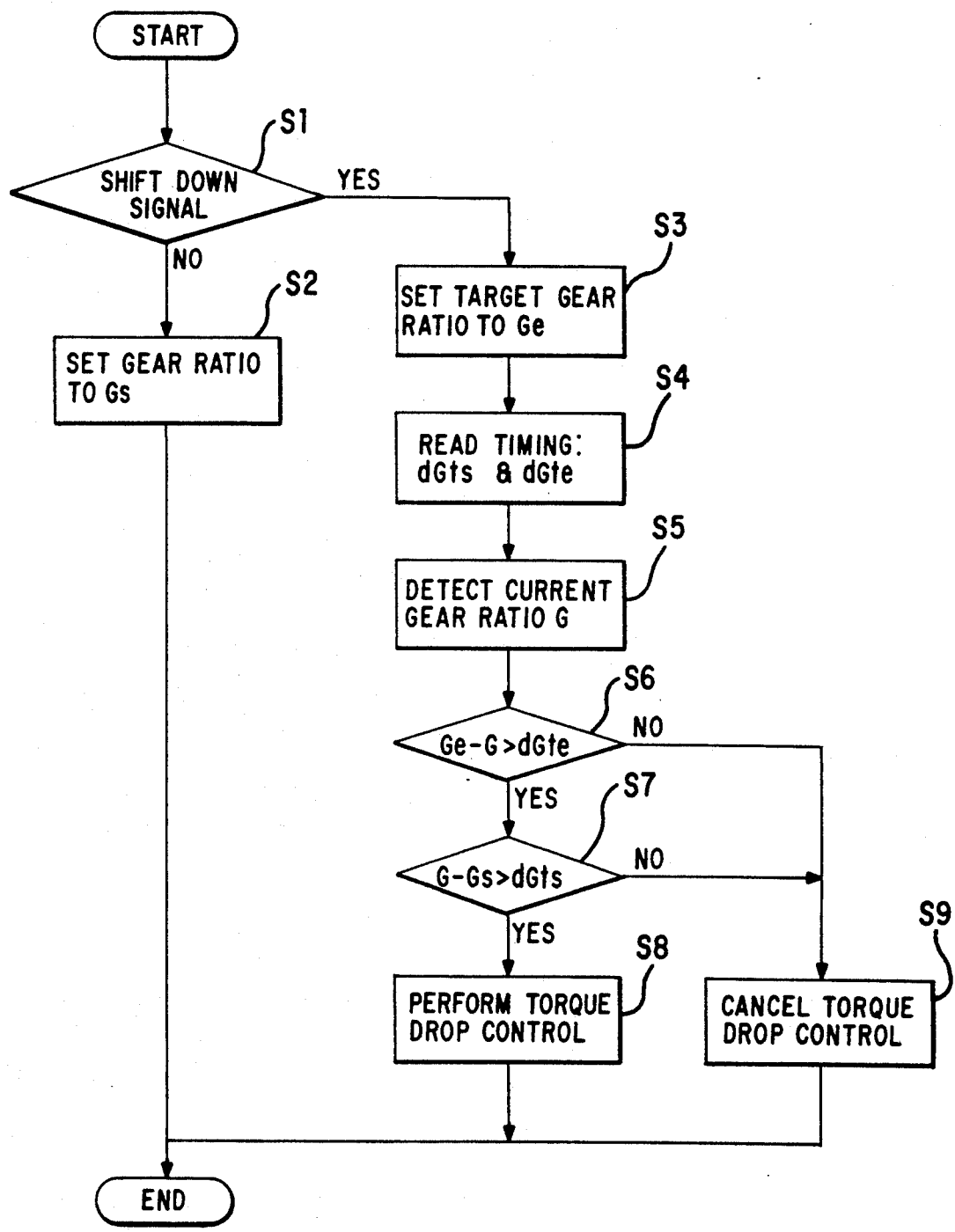
FIG. 3 is a flow chart illustrating a control sequence for a microcomputer which controls operation of the engine.

The operation of the automobile engine 1 equipped with the automatic transmission 8 shown in FIG. 1 is best understood by viewing FIG. 3, which is a flow chart illustrating an engine torque dropping control sequence for the microcomputer of the control unit 9. Programming a computer is a skill well understood in the art. The following description is written to enable a programmer having ordinary skill in the art to prepare an appropriate program for the microcomputer. The particular details of any such program, of course, depend on the architecture of the particular computer selected.

The first operation, represented by step S1 in FIG. 3, is to detect the occurrence of a downshift signal. When there is no downshift signal, after simply setting the gear ratio to a gear ratio Gs at the beginning of a downshift in step S2, the sequence is finished. On the other hand, when there is a shift down signal, a target gear ratio Ge is calculated, based on the gear ratio Gs at the start of downshift according to a shift pattern, in step S3.

In step S4, a time for starting a proper engine torque drop, which is equivalent to the gear ratio difference dGts, is read out from the gear ratio difference map shown in FIG. 2B. In the same manner, a time for stopping the proper engine torque drop, which is equivalent to a gear ratio difference dGte, is read out from the gear ratio difference map shown in FIG. 2B. Thereafter, in step S5, a current gear ratio G, which changes every moment as a result of a downshift, is calculated and, in step S6, a decision is made as to whether the difference between the target gear ratio Ge at the end of a downshift and a current gear ratio G is larger than the gear ratio difference dGte at the end of a downshift. If the answer to the decision made in step S6 is yes, the proper engine torque drop is not yet finished. Then, in step S7, another decision is made as to whether the difference between the gear ratio Gs at the start of downshift and a current gear ratio G is larger than the gear ratio difference dGte at the end of a downshift. If the answer to this decision is yes, the engine torque drop control is performed in step S8. However, if the answer to the decision is no in either step S6 or step S7, the time for stopping the engine torque drop has been reached. Then, the engine torque dropping control is cancelled.

Figure 4A:
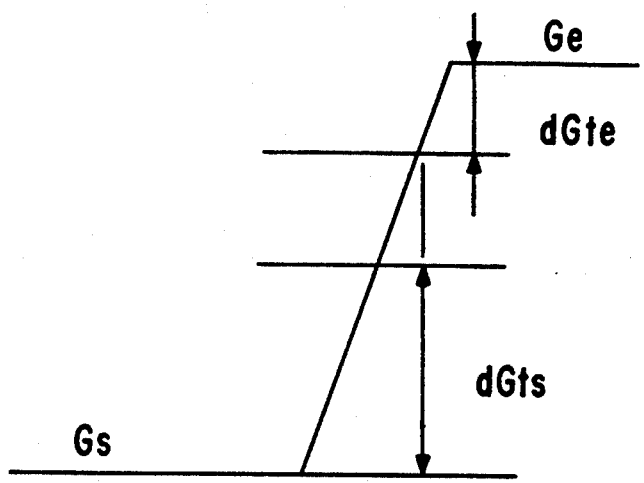
FIGS. 4A to 4C are time charts for explaining the operation of the engine control system.
Figure 4B:
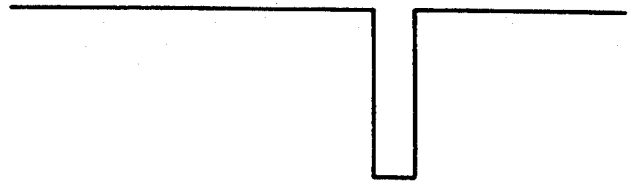
Figure 4C:
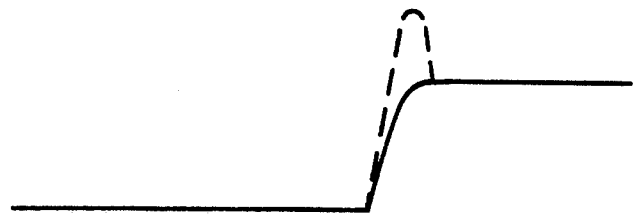

As described above, the engine torque dropping control starts at a time when the current gear ratio gradually increases after the commencement of a downshift and attains the sum of the gear ratio Gs and the gear ratio difference dGts at the beginning of a downshift. The engine torque dropping control is finished at a time when the current gear ratio attains the target gear ratio difference dGte from the target gear ratio Ge at the end of a downshift, as is apparent from FIG. 4A and 4B. This engine torque dropping control is actually performed by adjusting an ignition timing as is shown in FIG. 4B. As a result of ignition timing adjustment, the engine output torque is controlled as is shown by a solid curve in FIG. 4C. The dashed line curve in FIG. 4C shows the engine output torque when no engine torque dropping control is performed.

It is to be understood that although the present invention has been described in detail with respect to a preferred embodiment thereof, various other embodiments and variants may occur to those skilled in the art. Any such other embodiments and variants which fall within the scope and spirit of the present invention are intended to be covered by the following claims.

What is claimed is:

1. A control system controlling an engine equipped with an automatic transmission, comprising:
    signal detecting means for detecting a downshift signal provided by said automatic transmission; and
    a control unit for controlling a time at which an engine output torque starts to drop after said signal detecting means detects a downshift signal, calculating a value representative of an engine output torque, and advancing time as said value becomes larger when said signal detecting means detects a downshift signal.

2. A control system as recited in claim 1, wherein said time is determined based on a gear ratio.

3. A control system as recited in claim 2, wherein said engine torque control means controls a time at which the engine output torque begins to drop.

4. A control system as recited in claim 2, wherein said engine torque control means controls time at which the engine output torque is finished dropping.

5. A control system as recited in claim 2, wherein said gear ratio is determined according to a turbine speed and a vehicle speed.

6. A control system as recited in claim 1, wherein said engine output torque is further controlled according to a time of ignition.

* * * * *